(12) United States Patent
Mohamad et al.

(10) Patent No.: US 9,518,227 B2
(45) Date of Patent: Dec. 13, 2016

(54) METHOD FOR PRODUCING BIOFUEL (75) Inventors: Hisam Mohamed Wahab Mohamad, Selangor (MY); Freddy Wee Teck Teo, Selangor (MY); Mohammad Ghaddaffi Bin Mohd Noh, Selangor (MY)

(73) Assignee: Petroliam Nasional Berhad (Petronas) (MY)

( * ) Notice: Subject to any disclaimer, the term of this patent is extended or adjusted under 35 U.S.C. 154(b) by 892 days.

(21) Appl. No.: 13/637,192

(22) PCT Filed: Feb. 25, 2011

(86) PCT No.: PCT/MY2011/000016
§ 371 (c)(1),
(2), (4) Date: Sep. 25, 2012

(87) PCT Pub. No.: WO2011/119016
PCT Pub. Date: Sep. 29, 2011

(65) Prior Publication Data
US 2013/0020188 A1    Jan. 24, 2013

(30) Foreign Application Priority Data
Mar. 26, 2010 (MY) .................. PI 2010001374

(51) Int. Cl.
C10B 57/02 (2006.01)
C10B 47/24 (2006.01)
C10B 53/02 (2006.01)
C10B 49/10 (2006.01)

(52) U.S. Cl.
CPC .............. *C10B 57/02* (2013.01); *C10B 47/24* (2013.01); *C10B 49/10* (2013.01); *C10B 53/02* (2013.01); *Y02E 50/14* (2013.01)

(58) Field of Classification Search
CPC ..................................... Y02E 50/14
IPC .......... C10B 57/02, 47/24, 53/02, 27/00; Y02E 50/14
See application file for complete search history.

(56) References Cited

U.S. PATENT DOCUMENTS

| 1,598,290 | A | * | 8/1926 | Wirt ............................. 202/114 |
| 4,822,935 | A | * | 4/1989 | Scott ............................ 585/240 |
| 4,922,839 | A | * | 5/1990 | Boucher ........................ 110/234 |
| 4,968,325 | A | * | 11/1990 | Black et al. ..................... 48/76 |

(Continued)

FOREIGN PATENT DOCUMENTS

DE    103 09 530    9/2004

OTHER PUBLICATIONS

Yang, Haiping; Yan, Rong; Chen, Hanping; Ho Lee, Dong; Zheng, Chuguang, "Characteristics of hemicellulose, cellulose and lignin pyrolysis" Jan. 10, 2007, Fuel, vol. 86.*

(Continued)

*Primary Examiner* — In Suk Bullock
*Assistant Examiner* — Jonathan Pilcher
(74) *Attorney, Agent, or Firm* — Baker & Hostetler LLP (57) ABSTRACT The present invention relates to a method for producing biofuel from biomass material, comprising the steps of (a) pyrolyzing a first fraction of the biomass material having a pyrolysis temperature that is lower relative to the pyrolysis temperature of a second fraction of the biomass material to thereby produce a primary volatile fraction, and (b) separating the primary volatile fraction from the biomass material before pyrolyzing the second fraction, to thereby produce biofuel.

17 Claims, 5 Drawing Sheets

(56) References Cited

U.S. PATENT DOCUMENTS

| | | | |
|---|---|---|---|
| 5,101,740 A * | 4/1992 | Abril | 110/230 |
| 5,728,271 A * | 3/1998 | Piskorz et al. | 201/8 |
| 2006/0280669 A1* | 12/2006 | Jones | 423/445 R |
| 2010/0115841 A1* | 5/2010 | Cork | C10B 53/02 48/209 |

OTHER PUBLICATIONS

International Patent Application No. PCT/MY2011/000016: International Search Report and Written Opinion dated May 9, 2011, 7 pages.

* cited by examiner

METHOD FOR PRODUCING BIOFUEL

CROSS-REFERENCE TO RELATED APPLICATIONS

This application is the National Stage of International Application No. PCT/MY2011/000016 filed Feb. 25, 2011, which claims the benefit of Malaysia application number PI 2010001374, filed Mar. 26, 2010, the disclosures of which are incorporated herein by reference in their entirety.

TECHNICAL FIELD

The present invention generally relates to a method for producing biofuel from biomass material. The present invention also relates to a system for producing biofuel.

BACKGROUND

As the demand for renewable energy grows, biomass material, that was once considered waste material, has become a key and valuable energy resource.

Biomass materials can be converted into biofuels, which is a form of bioenergy. There are two major routes for conversion of biomass materials to biofuels: biological conversion and thereto-chemical conversion. In the biological conversion process, fermentation of easily fermentable plant products to alcohols is achieved. These easily fermentable plant products can be extracted from corn kernels and sugar cane. One major disadvantage of this pathway is that only a fraction of the total carbon in the biomass material is converted to the final desired liquid hydrocarbon fuel.

In the thermo-chemical conversion process, solid biomass is converted to biofuels by the application of heat. One example of thermal conversion is pyrolysis, where the solid biomass material is decomposed by the action of heat into gaseous, liquids and solid decomposition products, essentially in the absence of air or oxygen. Historically, pyrolysis was a relatively slow process where the resulting liquid product was a viscous tar and non-reactive solids such as char and ash. However, researchers have discovered that a higher yield of a light pourable liquid was obtainable from biomass material through fast pyrolysis. Fast pyrolysis is a process in which biomass is rapidly heated to an elevated pyrolysis temperature for a very short time, and then rapidly cooled before chemical equilibrium can occur. In this way, the condensable vapors produced during fast pyrolysis are cooled to form the useful liquid product in the form of biofuel.

Biomass materials are typically composed of different structural and non-structural components, which have distinct chemical properties. The three main components in biomass materials are cellulose, hemicellulose and lignin, and all three have different optimal temperatures at which pyrolysis occurs. Cellulose, being the most stable component among the three, has the highest pyrolysis temperature. Typically, the fast pyrolysis process is optimized for cellulose pyrolysis because cellulose is the largest component of biomass material. This means that the fast pyrolysis is carried out at an elevated pyrolysis temperature, which is high enough to pyrolyse cellulose. One disadvantage at carrying out pyrolysis at such a high temperature is that the less stable lignin and hemicellulose tends to yield significant amounts of tar and gases instead of the condensable vapors that can be cooled to form biofuel. More disadvantageously, the tar and ash produced pollutes the biofuel that is produced, resulting in a biofuel that is of low calorific quality and which contains impurities.

There is a need to provide a method for producing biofuel from biomass material that overcomes, or at least ameliorates, one or more of the disadvantages described above.

There is also a need to provide a system for producing biofuel with a minimal amount of pollutants.

SUMMARY

According to a first aspect, there is provided a method for producing biofuel from biomass material, comprising the steps of (a) pyrolysing a first fraction of the biomass material having a pyrolysis temperature that is lower relative to the pyrolysis temperature of a second fraction of the biomass material to thereby produce a primary volatile fraction, and (b) separating the primary volatile fraction from the biomass material before pyrolysing the second fraction, to thereby produce biofuel.

Advantageously, different fractions of the biomass material can be pyrolysed at different temperatures, resulting in the optimal pyrolysis of each fraction of the biomass material. More advantageously, the volatile products of the pyrolysis of the first fraction are removed before the pyrolysis of the second fraction takes place, so that the products of the pyrolysis of the first fraction do not undergo secondary reactions. Secondary reactions of the products of pyrolysis are undesirable because the products may become unsuitable for use as biofuels once they undergo a secondary reaction.

In one embodiment, the disclosed process further comprises the step of (a) pyrolysing the second fraction having a pyrolysis temperature that is lower relative to the pyrolysis temperature of a third fraction of the biomass material to thereby produce a secondary volatile fraction, and (b) separating the secondary volatile fraction from the biomass material before pyrolysing the third fraction. In another embodiment, the disclosed process further comprises the step of separating a tertiary volatile fraction produced from the pyrolysis of the third fraction from the biomass material. In yet another embodiment, the disclosed process further comprises the step of condensing at least a portion of at least one of the primary, secondary or tertiary volatile fractions to thereby produce the biofuel.

Advantageously, because each fraction is pyrolysed at its optimal temperature, the production of tar and ash is minimized or even eliminated. Accordingly, the production of useful biofuel is increased.

According to a second aspect, there is provided a system for producing biofuel comprising heating means for heating a biomass material located in a pyrolysis zone, the biomass material comprising a first fraction that has a lower pyrolysis temperature relative to a second fraction wherein the heating means is configured to selectively heat the biomass material to sequentially pyrolyse the first fraction of the biomass material and then the second fraction of the biomass material while in the pyrolysis zone, and vapor removal means for removing a volatile fraction of the pyrolysis from the pyrolysis zone, wherein the vapor removal means is configured to remove the volatile fraction between sequential heating of the first and second fractions of the biomass material.

DEFINITIONS

The following words and terms used herein shall have the meaning indicated:

The term "pyrolysis" as used herein refers to a process wherein organic material is chemically decomposed by heating, typically in the absence of oxygen. Pyrolysis of organic material usually results in gaseous, liquid and solid decomposition products.

The term "fraction", in the context of this specification when used herein with reference to a biomass material refers to one of the components of a biomass material that has a pyrolysis temperature or temperature range, which is different from other components of the biomass material.

The term "pyrolysis temperature" as used herein refers to the temperature, or range of temperatures at which a particular biomass fraction, as defined above, pyrolyses.

The term "biofuel" as used herein refers to a variety of fuels made from biomass sources. These biomass sources or biomass material include any plant or animal derived organic matter such as dedicated energy crops and trees, agricultural crop wastes and residues, wood wastes and residues, aquatic plants, algae, plant oils, animal oils, animal tissues, animal wastes, municipal wastes, and other waste materials. Biofuels may include, but are not limited to, hydrocarbons, hydrocarbons in the middle distillate range (having a boiling point up to about 350° C.), diesels, kerosenes, gasoline, gasoline fractions, biodiesel, biojet fuel, biogasolines and combinations thereof.

The word "substantially" does not exclude "completely" e.g. a composition which is "substantially free" from Y may be completely free from Y. Where necessary, the word "substantially" may be omitted from the definition of the invention.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DISCLOSURE OF OPTIONAL EMBODIMENTS

Exemplary, non-limiting embodiments of a method and system for producing biofuel from biomass material, will now be disclosed.

Biomass materials that may be used in the disclosed methods and systems include all types of organic feeds such as agricultural waste, wood waste, grasses, algae, water plants, organic refuse, municipal waste, sewage, sludge, animal waste, and combinations thereof.

Agricultural waste typically refers to ligneous-cellulosic-materials which comprise three main structural components-lignin, hemicellulose and cellulose. Lignin is a complex polymer of non-sugar organic molecules with molecular masses exceeding 10,000 units, which can be cross-linked to each other via a variety of chemical bonds. Lignin is highly resistant to degradation and is often cross-linked with hemicellulose to provide structural strength to the plant cell wall. Hemicellulose is a branched polysaccharide that typically comprises about 500 to 3000 sugar units. Depending upon the biomass material, hemicellulose may have varying compositions containing branched polymers of, for example, xylose, arabinose, galactose, mannose, and glucose.

Cellulose comprises about 7,000 to 15,000 glucose molecules primarily linked together with beta-(1-4) glycosidic bonds in a long unbranched polymer chain. Cellulose is typically embedded in an amorphous matrix of hemicellulose and lignin in the cell walls of the biomass material. It is to be understood that components other than lignin, hemicellulose and cellulose may be present in the biomass materials.

Exemplary agricultural waste includes, but is not limited to, palm waste, sugarcane bagasse, crop residues, sawdust, corn stover, soybean stover, grass, rice straw, wheat straw, and straw. In a preferred embodiment, the agricultural waste is palm waste. The palm waste may be palm trunks, palm fronds, palm kernel shells, empty fruit bunches (EFB), palm oil mill effluent (POME) or fiber (a fibrous residue of palm oil milling operation) collected from palm oil mill waste, and combinations thereof.

The content of the three structural components in a biomass material is dependent on factors such as the source of the material and the physical and/or chemical pre-treatment applied to the material, if any. Typically, the lignin content of ligneous-cellulosic material is about 5 wt % to about 23 wt %, about 6 wt % to about 22 wt %, about 7 wt % to about 21 wt %, about 8 wt % to about 20 wt %, about 9 wt % to about 19 wt %, about 10 wt % to about 18 wt %, or about 10 wt % to about 20 wt %. Preferably, the lignin content of the ligneous-cellulosic material is about 10 wt % to about 18 wt %.

Typically, the hemicellulose content of ligneous-cellulosic material is about 11 wt % to about 27 wt %, about 12 wt % to about 26 wt %, about 13 wt % to about 25 wt %, about 14 wt % to about 24 wt %, about 15 wt % to about 23 wt %, about 15 wt % to about 25 wt %, or about 16 wt % to about 22 wt %. Preferably, the hemicellulose content of the ligneous-cellulosic material is about 16 wt % to about 22 wt %.

Typically, the cellulose content of ligneous-cellulosic material is about 22 wt % to about 75 wt %, about 25 wt % to about 72 wt %, about 28 wt % to about 69 wt %, about 31 wt % to about 66 wt %, about 34 wt % to about 63 wt %, about 35 wt % to about 60 wt %, or about 38 wt % to about 59 wt %. Preferably, the cellulose content of the ligneous-cellulosic material is about 38 wt % to about 59 wt %.

For example, in EFB, the lignin content is about 10-20%, the hemicellulose content about 15-22%, and the cellulose content about 38-60%. In sugar cane bagasse, the lignin content is about 18-23%, the hemicellulose content about 20-25%, and the cellulose content about 35-55%. In sawdust, the lignin content is about 25-45%, the hemicellulose content about 11-14%, and the cellulose content about 30-62%.

The biomass material for use in the disclosed method and system may be selected based on criteria such as availability due to for example geographical or seasonal variability, cost, suitability, desired product and product properties, and the like.

The biomass material may be pre-processed prior to being used in the disclosed methods, typically to obtain the desired particle size. Particle size is an important parameter in determining the efficacy of the pyrolysis reaction. Particle size of biomass materials for use in the disclosed methods is preferably less than about 2 mm in diameter, more preferably less than about 1 mm in diameter, and most preferably less than about 0.5 mm in diameter.

The EFB biomass particles are usually in, the form of strands or fibers. The length of the strand is an important parameter in determining the efficacy of the pyrolysis reaction. The EFB fibre strand length for use in the disclosed methods is preferably less than about 2 mm, more preferably less than about 1 mm, and most preferably less than about 0.5 mm.

Other pre-processing steps may be applied to the biomass material for example, to obtain the desired moisture content. The moisture content of biomass materials varies widely depending on the source, and determines the availability of solid materials that can be potentially converted to biofuel. Preferably, the moisture content is about 6% to about 24%. More preferably, the moisture content is about 8% to about 22%. Most preferably, the moisture content is about 10% to about 15%. Hence, where biomass materials having high moisture contents are used, pre-drying may be applied to the biomass materials prior to pyrolysis. For example, raw EFB has a high moisture content of about 65%, which can negatively affect the conversion of the biomass material to biofuel, and is therefore typically subjected to pre-drying prior to pyrolysis.

The selected biomass material may be pyrolyzed in two or more sequential pyrolytic steps. The temperature at which the pyrolysis reaction in each pyrolytic step is conducted depends on the fraction of the biomass material that is to be pyrolyzed. For example, if lignin is the fraction of the biomass material that is to be pyrolyzed, the pyrolysis reaction would be conducted at the pyrolysis temperature of lignin, which is about 250° C. to about 350° C. Hence, the temperature of the pyrolysis may be conducted at about 250° C. to about 350° C., about 260° C. to about 340° C., about 270° C. to about 330° C., about 280° C. to about 320° C., or about 290° C. to about 310° C. Similarly, if hemicellulose is the fraction of the biomass material that is to be pyrolyzed, the pyrolysis reaction would be conducted at the pyrolysis temperature of hemicellulose, which is about 350° C. to about 425° C. Hence, the temperature of the pyrolysis may be conducted at about 375° C. to about 425° C., about 380° C. to about 420° C., about 385° C. to about 415° C., about 390° C. to about 410° C., or about 395° C. to about 405° C. if cellulose is the fraction of the biomass material that is to be pyrolyzed, the pyrolysis reaction would be conducted at the pyrolysis temperature of cellulose, which is about 425° C. to about 525° C. Hence, the temperature of the pyrolysis may be conducted at about 425° C. to about 525° C., about 435° C. to about 515° C., about 445° C. to about 505° C., about 455° C. to about 495° C., or about 465° C. to about 485° C.

Other pyrolysis parameters, such as pressure, heating rate and pyrolyzing environment (for example, presence of hydrogen, helium, and air) may also affect the yield of the biofuel and its composition. Preferably, the pyrolysis reaction is carried out at a pressure of about 0.01 MPa to about 0.5 MPa, more preferably at a pressure of about 0.05 MPa to about 0.2 MPa, and most preferably a pressure of about 0.103 MPa.

The heating rate is preferably at 10° C. per minute, more preferably at 200° C. per minute, and most preferably at 100° C. per minute. The heating rate may also be a variable heating rate dependent on the amount of biomass supplied and the size of the vessel in which the pyrolysis occurs.

Preferably, the pyrolysis reaction is carried out in the absence of air or oxygen. Preferably, the pyrolysis reaction is carried out in the presence of inert gases, for example nitrogen.

The pyrolysis reaction in each pyrolytic step results in production of volatile fractions in the form of liquids as well as viscous tar, gaseous and solid materials. The volatile fractions may be condensed and collected to produce biofuel. Depending on the composition, the gaseous materials may be discarded, or may be condensed into liquid to produce biofuel. Condensation of the gaseous materials is typically carried out at a temperature of about 25° C. to about 45° C., about 26° C. to about 44° C., about 27° C. to about 43° C., about 28° C. to about 42° C., about 29° C. to about, 41° C., or about 30° C. to about 40° C., depending on the constituents of the gaseous materials. The solid materials are typically char and ash which may be discarded.

In some embodiments, the disclosed method may comprise more than three sequential pyrolytic steps, for example, four, five, six, seven etc. sequential pyrolytic steps, each conducted at a progressively higher temperature range corresponding to the pyrolysis temperature of a fraction of the biomass material.

It is also to be understood that, where only a first fraction and a second fraction of a biomass material have been referred to, it does not mean that the biomass material has only two fractions. The biomass material may have 3, 4, 5, 6, 7, 8, 9, or 10 fractions, but only two fractions (that is, a first fraction and a second fraction) are pyrolysed in the sequential pyrolytic steps of the disclosed methods.

Typically, pyrolysis of biomass material using the disclosed methods yields more than about 65 wt % liquids. For example, pyrolysis of biomass material using the disclosed methods may yield about 67 wt % to about 80 wt %, about 66 wt % to about 81 wt %, about 69 wt % to about 82 wt %, about 70 wt % to about 83 wt %, about 71 wt % to about 84 wt %, about 72 wt % to about 85 wt % liquids, about 73 wt % to about 86 wt % liquids, about 74 wt % to about 87 wt % liquids, about 75 wt % to about 88 wt % liquids, about 76 wt % to about 89 wt % liquids, or about 77 wt % to about 90 wt % liquids. A person skilled in the art would appreciate that such yields would depend on factors such as, but not limited to, the type of biomass material used and the conditions of the pyrolysis reactions. Preferably, the yield of viscous tar is less than about 20 wt %, less than about 19 wt %, less than about 18 wt %, less than about 17 wt %, less than about 16 wt %, less than about 15 wt %, less than about 14 wt %, less than about 13 wt %, less than about 12 wt %, less than about 11 wt %, less than about 10 wt %, less than about 9 wt %, less than about 8 wt %, less than about 7 wt %, less than about 6 wt % or less than about 5 wt %. In one embodiment, the yield of viscous tar is about 5-10 wt %.

The disclosed method may be conducted in a system as disclosed herein. The disclosed system may comprise heating means for heating a biomass material located in a pyrolysis zone, the biomass material comprising a first fraction that has a lower pyrolysis temperature relative to a second fraction, wherein the heating means is configured to selectively heat the biomass material to sequentially pyrolyse the first fraction of the biomass material and then the second fraction of the biomass material while in the pyrolysis zone; and vapor removal means for removing a volatile fraction of the pyrolysis from the pyrolysis zone, wherein the vapor removal means is configured to remove the volatile fraction between sequential heating of the first and second fractions of the biomass material.

In one embodiment, the pyrolysis zone may comprise a first vessel and a second vessel in series for pyrolyzing the first and second fraction of the biomass material. The pyrolysis zone may further comprise a third vessel for pyrolysing a third fraction of the biomass material. The first, second and third vessels may transfer biomass material from the first vessel to the second vessel and to third vessel, that are connected in series.

In another embodiment, the pyrolysis zone may comprise a single vessel in which the temperature changes successively.

The vessel in which the pyrolysis takes place may be any type of vessel that is known to a person skilled in the art. Such vessels include, but are not limited to, fluidized bed reactors, circulating fluidized bed reactors, fixed bed reactors, cyclonic ablative reactors, rotating cone reactors, vacuum pyrolysis reactors, and transport reactors.

The heating means may be any heat source that is capable of heating the biomass material located in the pyrolysis zone. The heating means may comprise one or more electrical heating elements, or one or more heat exchangers, through which, for example, hot water is circulated. The heating means may also comprise electric or gas heaters, or jets or hot air which can be directed specifically at the pyrolysis zone. The heating means may also be a waste heat source, a solar heat source or a geothermal heat source. Exemplary waste heat sources include flue gases from gas turbines in power plants and incinerators, process gases of chemical and metallurgical operations and waste heat from other industrial processes.

The vapor removal means may be any suitable means for removing a volatile fraction of the pyrolysis from the pyrolysis zone. In one embodiment, the vapor removal means may comprise of a vent or outlet, which is preferable in fluid communication with a vacuum, for allowing the volatile products of pyrolysis to be removed. In this embodiment, the vent or outlet may be arranged in the upper section of the pyrolysis zone so as to be suitably located to allow any hot volatile fractions which rise from the pyrolysis zone to leave the pyrolysis zone. In another embodiment, the vapor removal means may comprise of a vacuum pump coupled to the pyrolysis zone. In this embodiment, the volatile fraction is removed from the pyrolysis zone by suction.

In one embodiment, a fluidized bed reactor is used. In a fluidized bed reactor, the biomass particles are introduced into a bed of hot sand fluidized by a gas, which is typically a re-circulated product gas. Heat may be provided by heat exchanger tubes through which hot combustion gas flows. High heat transfer rates from the fluidized sand result in rapid heating of the biomass particles.

Circulating fluidized bed reactors may also be used, where biomass particles are introduced into a circulating fluidized bed of hot sand. Gas, sand and biomass particles move together, with the transport gas typically being a re-circulated product gas or a combustion gas. As in a fluidized bed reactor, high heat transfer rates from the fluidized sand in the circulating fluidized bed reactor also allows rapid heating of the biomass particles. A fast separator may then be used to separate the product gases and vapors from the sand and char particles. The sand particles may be reheated in a fluidized burner vessel and recycled into the reactor.

In one embodiment, a fixed bed reactor is used. The biomass particles are packed into the reactor. A blower may be used to supply the air required for burning the biomass.

In one embodiment, a cyclonic ablative reactor is used. Biomass particles suspended in a carrier gas may be introduced at high speed through a cyclone whose wall is heated. The biomass particles may be moved continuously at high speed against the hot reactor wall. The wall sweeps the primary depolymerized liquids from the reacting surface where they may be immediately vaporized and carried to a quenching unit.

In one embodiment, a rotating cone reactor is used. Pre-heated hot sand and biomass particles are introduced into a rotating cone. The mixture of sand and biomass is transported across the cone surface by centrifugal force as a result of the rotation of the cone.

In one embodiment, a vacuum pyrolysis reactor may be used. Operation under vacuum allows the primary depolymerized liquids at the surface of the reacting biomass particles to be rapidly drawn from the surface and removed from the reaction zone before they degrade to less valuable secondary products.

In one embodiment, a transport reactor is used. The transport reactor may employ a gas or a combination of gas and solids as the heat transport medium, and may be an upflow or a downflow tubular reactor. A solid heat transport medium may be, for example, hot char or any other inert or catalytic solid particulate heat carrier.

Each vessel may further be equipped with a temperature control unit to maintain the reaction temperature at the required pyrolysis temperature, and a pressure control unit to maintain the vessel at the required reaction pressure.

At least two vessels are used in the disclosed system, depending on how many fractions of the biomass material are to be pyrolysed at their respective pyrolysis temperature. Hence, there may be, for example, two, three, four, five, six, seven, etc. vessels in the disclosed system. Each vessel in the disclosed system is preferably connected to the next vessel in series. The vessels in the disclosed system may be of the same type, or may be of different types. For example, in one embodiment, the disclosed system has two vessels and both vessels are fluidized bed reactors. In another embodiment, the disclosed system has two vessels, where the first of the two vessels is a fluidized bed reactor and the second of the two vessels is a cyclonic ablative reactor.

The system may further comprise a cyclone attached to each vessel for separating the biomass particles, viscous tar and solid materials from the volatile fractions and gaseous materials during or after each pyrolysis reaction. The cyclone separator may optionally have a filter on one of the gas exits of the cyclone separator. The solid materials in the cyclone separator may comprise the solids which were already present in the feed stream or solids that are products of the pyrolysis reaction such as char and ashes.

The viscous tar and solid materials that are separated from the volatile and gaseous materials may be channeled to a tar/solid material collector for disposal. The volatile fractions may be channeled to a quenching unit, where the volatile fractions are rapidly quenched by, for example, a stream of cold nitrogen gas, and condensed to a liquid product in the condenser. The condenser may be a water-cooled condenser. The condensed liquid product may be collected in one or more liquid collectors. The liquid collectors may be ice-cooled liquid collectors.

The disclosed system may also comprise a dryer, typically an air dryer, to dry the biomass material prior to being fed into the reaction vessel to remove excess moisture from the biomass material and achieve a desirable moisture content. The dried biomass material may be channeled to a grinder for reducing the biomass material to a suitable particle size. Preferably, the grinder reduces the particle size of the biomass material to less than about 2 mm in diameter, more preferably to less than about 1 mm in diameter, and most preferably to less than about 0.5 mm in diameter. The ground particles may be passed through a sieve to separate out the particles having unsuitable sizes while retaining particles having the desirable sizes. The particles having the desirable particles sizes may be stored in a biomass material container prior to being channeled into the reaction vessel by a feeder, which may be, for example, a screw feeder or a piston-type feeder.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

DETAILED DESCRIPTION OF DRAWINGS

Figure 1:
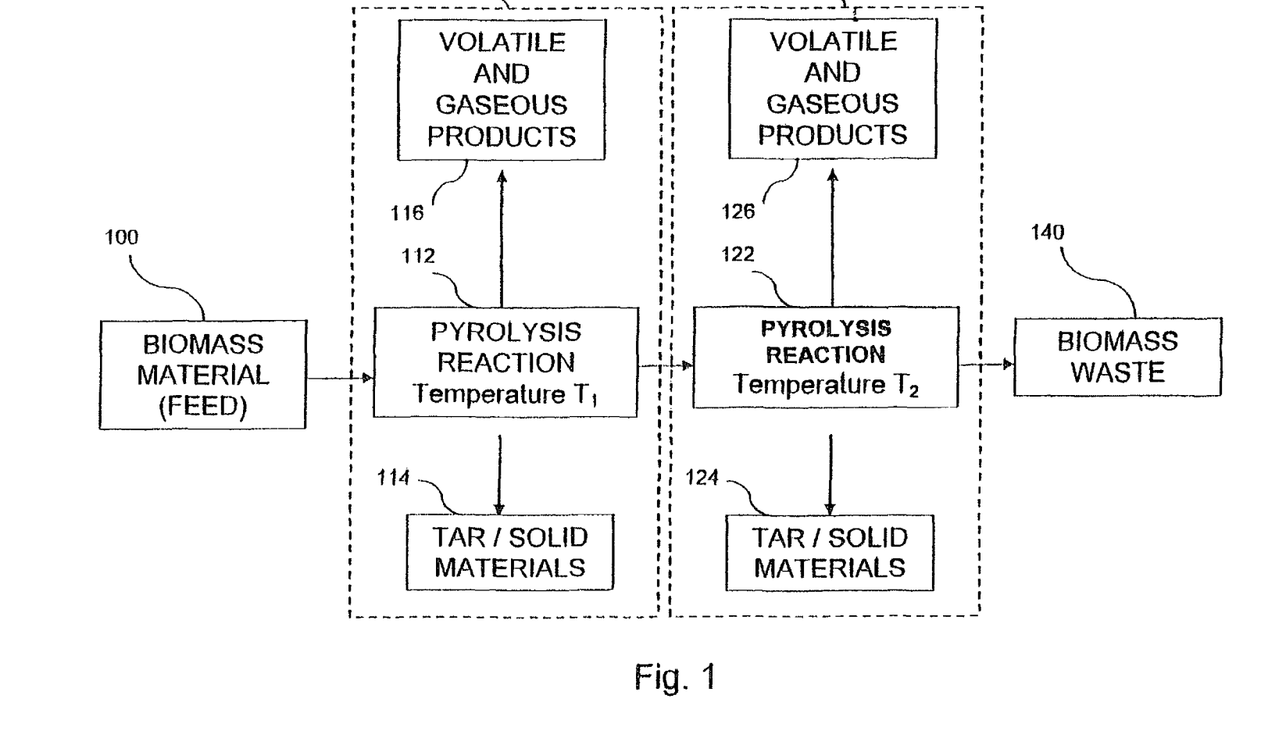
FIG. 1 shows a schematic diagram of a method for producing biofuel according to one disclosed embodiment.

Referring to FIG. 1, there is shown one embodiment of the disclosed method. In this embodiment, the disclosed method comprises two sequential pyrolytic steps 110 and 120. In the first pyrolytic step 110, the pyrolysis reaction 112 is conducted at a temperature range that corresponds to the pyrolysis temperature '$T_1$' of a first fraction of the biomass material 100 fed into the first pyrolytic step 110. The pyrolysis temperature '$T_1$' of the first fraction of the biomass material is lower relative to the pyrolysis temperature '$T_2$' of a second fraction of the biomass material. Volatile liquid and gaseous products 116 of the first pyrolytic step 110 are separated from the biomass material and collected, while the viscous tar and solid materials 114 such as char and ash formed from the pyrolysis reaction are discarded. At least a portion of the liquid product may be used as biofuel, either directly or after further refining processes. The gaseous products may be discarded, or may be condensed to liquid for use as biofuel, either directly or after further refining processes.

The biomass material is then subjected to a second pyrolytic step 120 where a pyrolysis reaction 122 is conducted at a temperature range that corresponds to the pyrolysis temperature '$T_2$' of the second fraction of the biomass material. Volatile liquid and gaseous products 126 of the second pyrolytic step 120 are separated from the biomass material and collected, while the viscous tar and solid materials 124 such as char and ash formed from the pyrolysis reaction are discarded. At least a portion of the liquid product may likewise be separated from the biomass material and collected for use as biofuel either directly or after further refining processes, while the gaseous product may likewise be discarded or condensed to liquid for use as biofuel, either directly or after further refining processes. The biomass waste 140 following the second pyrolytic step 120 is discarded.

In a specific embodiment, the first fraction of the biomass material is lignin, while the second fraction of the biomass material is hemicellulose. The pyrolysis temperature of lignin is about 250° C. to about 350° C., while the pyrolysis temperature of hemicellulose is about 350° C. to about 425° C. Accordingly, the pyrolysis reaction 112 in the first pyrolytic step 110 is conducted at a temperature range of from about 250° C. to about 350° C., while the pyrolysis reaction 122 in the second pyrolytic step 120 is conducted at a temperature range of from about 350° C. to about 425° C.

In another specific embodiment, the first fraction of the biomass material is hemicellulose, while the second fraction of the biomass material is cellulose. The pyrolysis temperature of hemicellulose is about 350° C. to about 425° C., while the pyrolysis temperature of cellulose is about 425° C. to about 525° C. Accordingly, the pyrolysis reaction 112 in the first pyrolytic step 110 is conducted at a temperature range of from about 350° C. to about 425° C., while the pyrolysis reaction 122 in the second pyrolytic step 120 is conducted at a temperature range of from about 425° C. to about 525° C.

In yet another specific embodiment, the first fraction of the biomass material is lignin, while the second fraction of the biomass material is cellulose. The pyrolysis temperature of lignin is about 250° C. to about 350° C., while the pyrolysis temperature of cellulose is about, 425° C. to about 525° C. Accordingly, the pyrolysis reaction 112 in the first pyrolytic step 110 is conducted at a temperature range of from about 250° C. to about 350° C., while the pyrolysis reaction 122 in the second pyrolytic step 120 is conducted at a temperature range of from about 425° C. to about 525° C.

Figure 2:
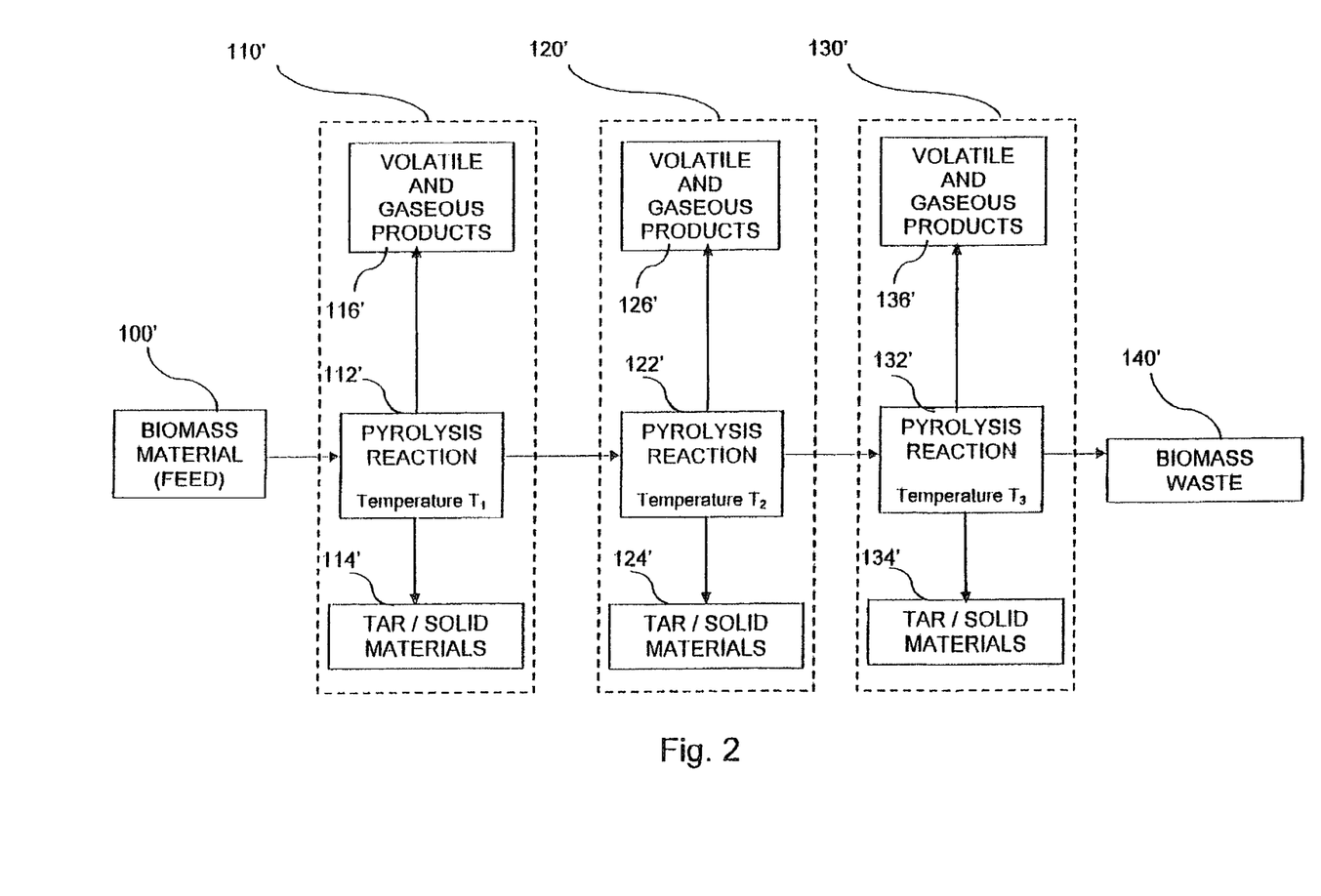
FIG. 2 shows a schematic diagram of a method for producing biofuel according to a second disclosed embodiment.

Referring to FIG. 2, there is shown another embodiment of the disclosed method. In this embodiment, the disclosed method comprises three sequential pyrolytic steps. In the first pyrolytic step 110', the pyrolysis reaction 112' is conducted at a temperature range that corresponds to the pyrolysis temperature '$T_1$' of a first fraction of the biomass material 100' fed into the first pyrolytic step 110'. The pyrolysis temperature '$T_1$' of the first fraction of the biomass material is lower relative to the pyrolysis temperature '$T_2$' of a second fraction of the biomass material. Volatile liquid and gaseous products 116' of the pyrolysis reaction 112' in the first pyrolytic step 110' are separated from the biomass material and collected, while the viscous tar and solid materials 114' such as char and ash formed from the pyrolysis reaction are discarded. At least a portion of the liquid product may be used as biofuel, either directly or after further refining processes. The gaseous products may be discarded, or may be condensed to liquid for use as biofuel, either directly or after further refining processes.

The biomass material is next subjected to a second pyrolytic step 120' where a pyrolysis reaction 122' is conducted at a temperature range that corresponds to the pyrolysis temperature '$T_2$' of the second fraction of the biomass material. The pyrolysis temperature '$T_2$' of the second fraction of the biomass material is lower relative to the pyrolysis temperature 'T₃' of a third fraction of the biomass material. Volatile liquid and gaseous products 126' of the pyrolysis reaction 122' in the second pyrolytic step 120' are separated from the biomass material and collected, while the viscous tar and solid materials 114' such as char and ash formed from the pyrolysis reaction are discarded. At least a portion of the liquid product may likewise be separated from the biomass material and collected for use as biofuel either directly or after further refining processes, while the gaseous product may likewise be discarded or condensed to liquid for use as biofuel, either directly or after further refining processes.

The biomass material is then subjected to a third pyrolytic step 130' where a pyrolysis reaction is conducted at a temperature range that corresponds to the pyrolysis temperature '$T_3$' of the third fraction of the biomass material. Volatile liquid and gaseous products 136' of the pyrolysis reaction 132' in the second pyrolytic step 130' are separated from the biomass material and collected, while the viscous tar and solid materials 134' such as char and ash formed from the pyrolysis reaction are discarded. A portion of the liquid product may likewise be separated from the biomass material and collected for use as biofuel either directly or after further refining processes, while the gaseous product may likewise be discarded or condensed to liquid for use as biofuel, either directly or after further refining processes. The biomass waste 140' following the third pyrolytic step 130' is discarded.

In a specific embodiment, the first fraction of the biomass material is lignin, the second fraction is hemicellulose and the third fraction is cellulose. Accordingly, the pyrolysis reaction in the first pyrolytic step 110' is conducted at a temperature range of from about 250° C. to about 350° C., the pyrolysis reaction in the second pyrolytic step 120' is conducted at a temperature range of from about 350° C. to about 425° C., the pyrolysis reaction in the third pyrolytic step 130' is conducted at a temperature range of about 425° C. to about 525° C.

Figure 3:
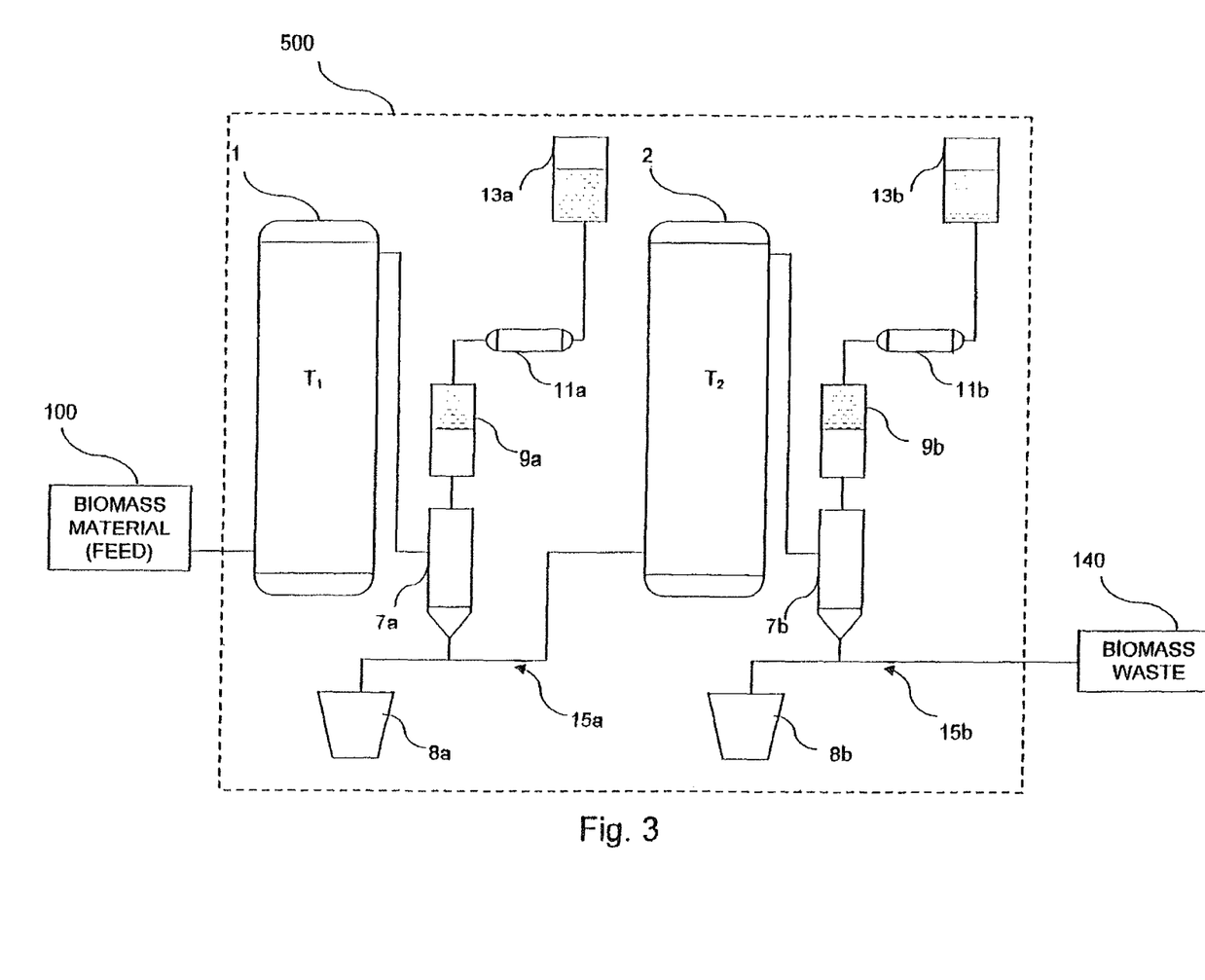
FIG. 3 shows a schematic diagram of a system for producing biofuel according to one disclosed embodiment.

Referring to FIG. 3, there is shown one embodiment of the disclosed system. In this embodiment, the system comprises two vessels 1 and 2 that are in series to each other in a pyrolysis zone 500. The first vessel 1 is for pyrolyzing a first fraction of a biomass material while the second vessel 2 is for pyrolyzing a second fraction of a biomass material. The pyrolysis temperature '$T_1$' of the first fraction is lower relative to the pyrolysis temperature '$T_2$' of the second fraction of the biomass material. Hence, the first vessel 1 is heated to and maintained at the pyrolysis temperature '$T_1$' of the first fraction while the second vessel 2 is heated to and maintained at the pyrolysis temperature '$T_2$' of the second fraction.

The first vessel 1 and second vessel 2 are both fluidized bed reactors.

A cyclone separator 7a, 7b is respectively connected to each of the first vessel 1 and the second vessel 2. Each cyclone separator 7a, 7b is connected to a tar/solid material collector 8a, 8b and a quenching unit 9a, 9b. Each quenching unit 9a, 9b is connected to a condenser 11a, 11b in which the liquid product is condensed. Each condenser 11a, 11b is connected to a liquid collector 13a, 13b in which the liquid biofuel product is collected.

The solid biomass particles 100 are fed into the first vessel 1, where pyrolysis occurs at 250° C. to 350° C. to pyrolyse the lignin fraction of the biomass particles. The products of pyrolysis are then channeled to the cyclone separator 7a, where the volatile fraction and gaseous materials are separated from the biomass particles and solid materials. The volatile fraction and gaseous materials are quenched in the quenching unit 9a, and then condensed in condenser 11a. The liquid biofuel product is collected in the liquid collector 13a.

The solid materials separated in the cyclone separator comprise the biomass particles, viscous tar, char and ash. The viscous tar, char and ash are collected in the tar/solid material collector 8a and are discarded. The solid biomass particles from the first vessel 1 exiting the cyclone separator 7a are channeled via a pipeline 15a to the second vessel 2 for the second pyrolytic step. In the second vessel 2, pyrolysis occurs at 350° C. to 425° C. to pyrolyse the hemicellulose fraction of the biomass particles.

After the second pyrolytic step, the products of pyrolysis are then channeled to the cyclone separator 7b, where the volatile fraction and gaseous materials are separated from the biomass particles and solid materials. The solid biomass particles from the second vessel 2 exiting the cyclone separator 7b are discarded via pipeline 15b. Viscous tar, char and ash are collected in the tar/solid material collector 8b and are discarded. The volatile fraction and gaseous materials are quenched in the quenching unit 9b, and then condensed in condenser 11b. The liquid biofuel product is collected in the liquid collector 13b.

Figure 4:
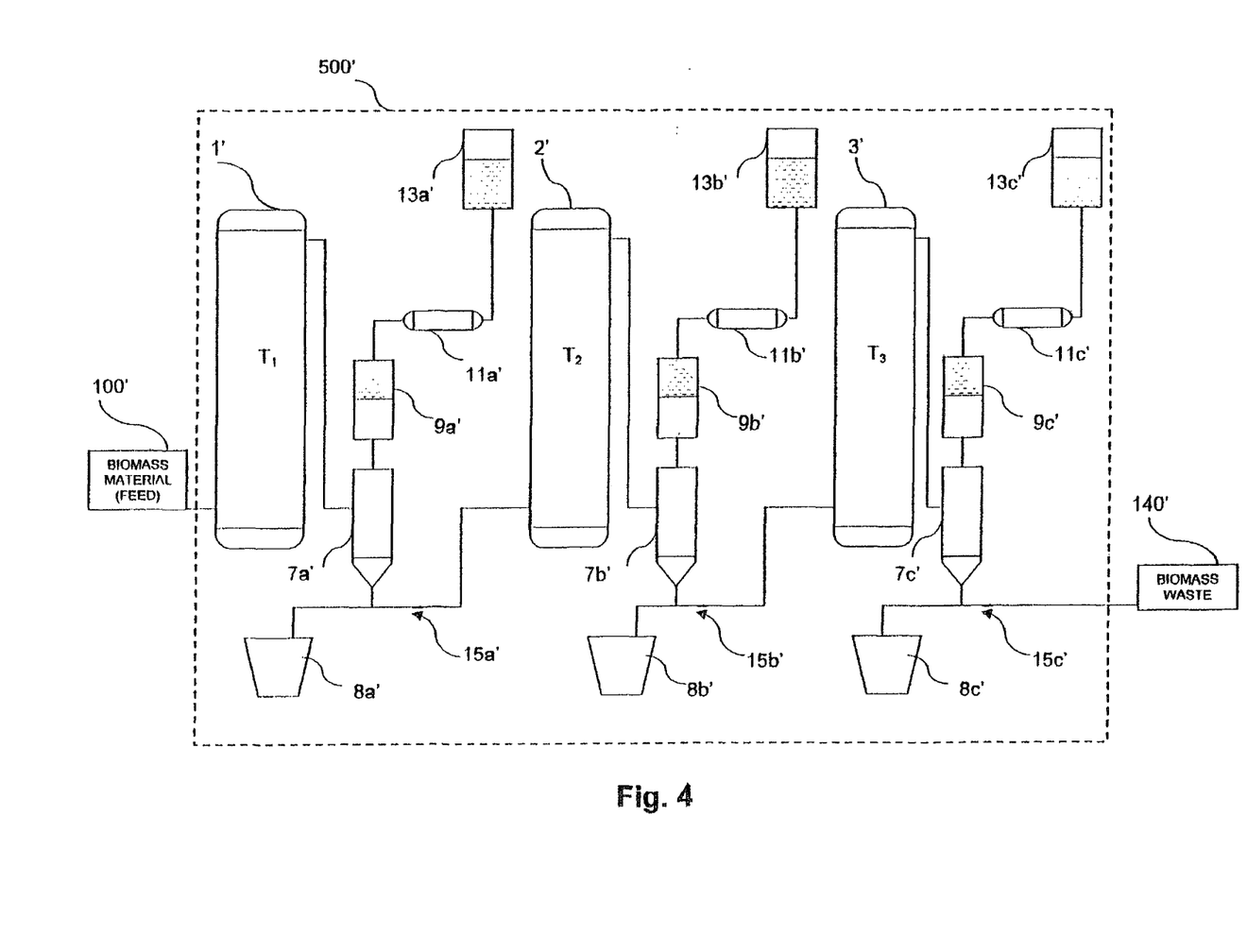
FIG. 4 shows a schematic diagram of a system for producing biofuel according to a second disclosed embodiment.

Referring to FIG. 4, there is shown another embodiment of the disclosed system. In this embodiment, the disclosed system 500' comprises three vessels 1', 2' and 3' that are in series to each other. The first vessel 1' is for pyrolyzing a first fraction of a biomass material, the second vessel 2' is for pyrolyzing a second fraction of a biomass material, and the third vessel 3' is for pyrolyzing a third fraction of a biomass material. The pyrolysis temperature '$T_1$' of the first fraction is lower relative to the pyrolysis temperature '$T_2$' of the second fraction of the biomass material, while the pyrolysis temperature '$T_2$' of the second fraction is lower relative to the pyrolysis temperature '$T_3$' of the third fraction of the biomass material. Hence, the first vessel 1 is heated to and maintained at the pyrolysis temperature '$T_1$' of the first fraction, the second vessel 2' is heated to and maintained at the pyrolysis temperature '$T_2$' of the second fraction, and the third vessel 3' is heated to and maintained at the pyrolysis temperature '$T_3$' of the third fraction.

The first vessel 1', second vessel 2' and third vessel 3' are fluidized bed reactors.

A cyclone separator 7a', 7b', 7c' is respectively connected to each of the first vessel 1', the second vessel 2' and the third vessel 3'. Each cyclone separator is connected to a tar/solid material collector 8a', 8b', 8c' and a quenching unit 9a', 9b', 9c'. Each quenching unit 9a', 9b', 9c' is connected to a condenser 11a', 11b', 11c' in which the liquid product is condensed. Each condenser 11a', 11b', 11c' is connected to a liquid collector 13a', 13b', 13c' in which the liquid biofuel product is collected.

The solid biomass particles from the first vessel 1' exiting the cyclone separator 7a' are channeled via a pipeline 15a' to the second vessel 2' for the second pyrolytic step. The biomass materials are pyrolysed sequentially in the first vessel 1' and second vessel 2' in the same manner as described above for FIG. 3, with the exception that after the second pyrolytic step, the solid biomass particles from the second vessel 2' exiting the cyclone separator 7b' are channeled via a pipeline 15b' to the third vessel 3' for the third pyrolytic step.

In the third vessel 3', pyrolysis occurs at 425° C. to 525° C. to pyrolyse the cellulose fraction of the biomass particles. The products of pyrolysis are then channeled to the cyclone separator 7c', where the volatile fraction and gaseous materials are separated from the biomass particles and solid materials. The volatile fraction and gaseous materials are quenched in the quenching unit 9c', and then condensed in condenser 11c'. The liquid biofuel product is collected in the liquid collector 13c'.

The solid materials separated in the cyclone separator 7c' comprise the biomass particles, viscous tar, char and ash. The viscous tar, char and ash are collected in the tar/solid material collector 8c' and are discarded. The solid biomass particles from the third vessel 3' exiting the cyclone separator 7c' are channeled via a pipeline 15c' to be discarded.

Figure 5:
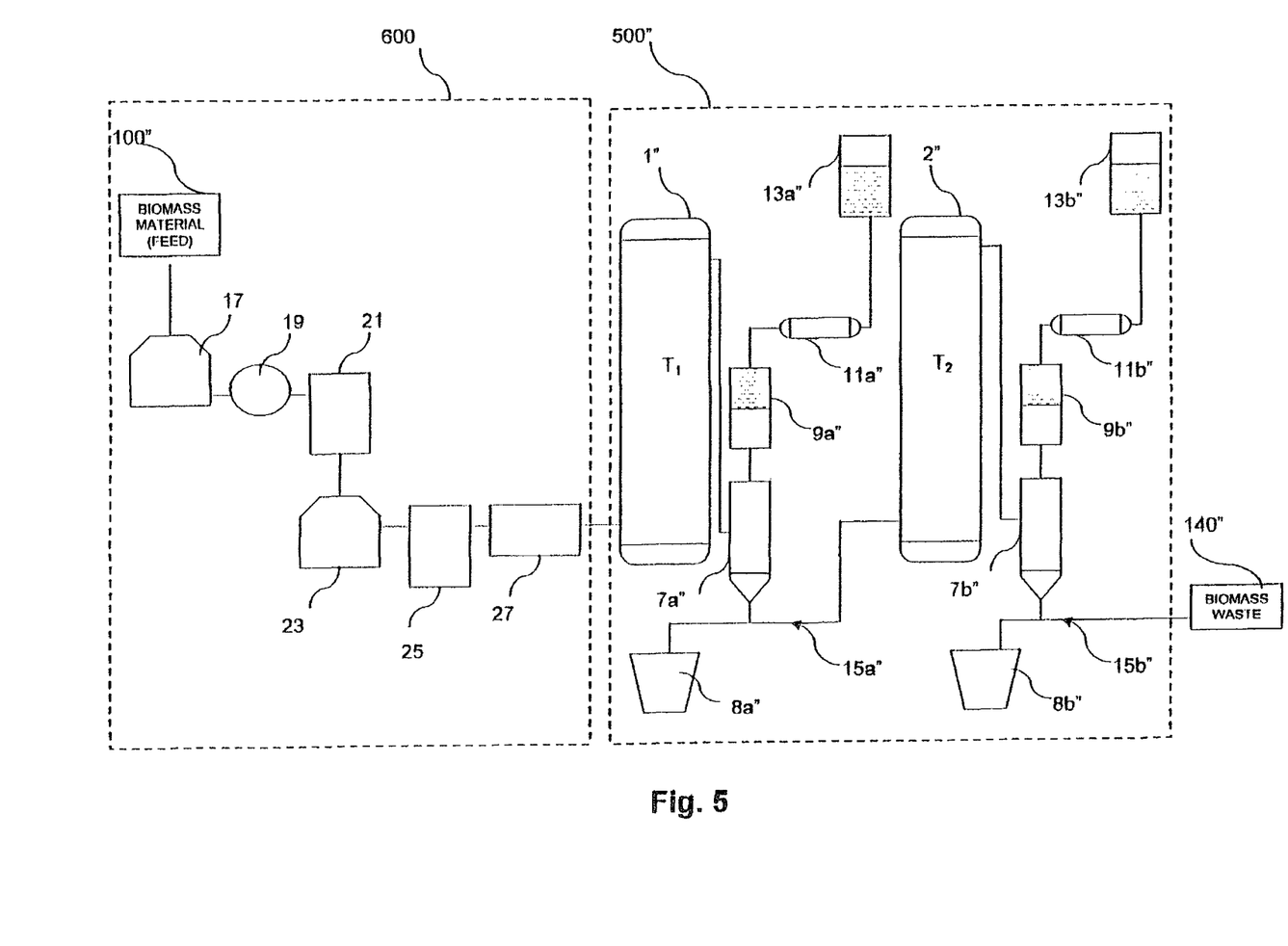
FIG. 5 shows a schematic diagram of a system for producing biofuel according to a third disclosed embodiment.

Referring to FIG. 5, there is shown yet another embodiment of the disclosed system. In this embodiment, the disclosed system further comprises a biomass pre-treatment system 600. The biomass material is first dried in an air-dryer 17 and then ground to the desirable particle size in the grinder 19. The ground particles are then separated based on particle size in the sieve 21 before being further dried in an oven dryer 23. The dried and ground biomass particles are then stored in a feed container 25 before being conveyed to a first vessel 1 in a pyrolysis zone via a screw feeder 27. The dried and ground biomass material is then fed into pyrolysis zone 500" comprising a first vessel 1" and second vessel 2" where the biomass material undergoes a first pyrolytic step in the first vessel 1" at the pyrolysis temperature '$T_1$' of a first fraction of the biomass material as described above with reference to FIG. 3. The reacted biomass material is then channeled to the cyclone separator 7a", where the tar is separated and collected in a tar/solid material collector 8a", and the volatile reaction product is quenched in the quenching unit 9a" before being condensed in the condenser 11a". The liquid biofuel product is collected in the liquid collector 13a" while the solid biomass particles from the first vessel 1" exiting the cyclone separator 7a" are channeled via the pipeline 15a" to the second vessel 2" for the second pyrolytic step. After the second pyrolytic step, the tar is separated and collected in a tar/solid material collector 8b", while the volatile reaction product is quenched in the quenching unit 9b" before being condensed in the condenser 11b". The liquid biofuel product is collected in the liquid collector 13b" and the solid biomass particles from the second vessel 2" exiting the cyclone separator 7b" may be discarded via pipeline 15b".

APPLICATIONS

Advantageously, the disclosed method for producing biofuel from biomass material provides an improved method for generating renewable energy. More advantageously, the disclosed method substantially reduces and even eliminates the production of gaseous and tar components coming from the relatively less stable lignin and hemicellulose, by pyrolysing each component of the biomass material at their respective optimum pyrolysis temperatures.

Advantageously, the disclosed method for producing biofuel from biomass material results in an increased liquid yield of biofuel. More advantageously, the disclosed method is more efficient as a higher percentage of biomass material is converted into biofuel. Yet more advantageously, the biofuel produced is of a higher quality due to the absence of tar and ash.

Advantageously, the disclosed system for producing biofuel results in the production of biofuel that is substantially free of pollutants. More advantageously, the disclosed system is more cost effective as it can achieve a higher percentage of liquid yield of about 67 wt % to about 85 wt %.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A method for producing biofuel from biomass material, comprising the steps of:
   pyrolysing a first fraction of the biomass material comprising lignin at a pyrolysis temperature that is lower relative to the pyrolysis temperature of a second fraction of the biomass material comprising hemicellulose to thereby produce a primary volatile fraction,
   separating the primary volatile fraction from the biomass material before pyrolysing the second fraction,
   condensing the primary volatile fraction to thereby produce biofuel,
   pyrolysing the second fraction at a pyrolysis temperature that is lower relative to the pyrolysis temperature of a third fraction of the biomass material comprising cellulose to thereby produce a secondary volatile fraction as biofuel, and separating the secondary volatile fraction from the biomass material before pyrolysing the third fraction, and
   pyrolysing the third fraction to produce a tertiary volatile fraction, and separating the tertiary volatile fraction produced from the pyrolysis of the third fraction from the biomass material as biofuel.

2. The method as claimed in claim 1, further comprising the step of condensing at least a portion of at least one of said secondary or tertiary volatile fractions to thereby produce said biofuel.

3. The method as claimed in claim 1, wherein the step of pyrolysing said first fraction is undertaken at a pyrolysis temperature of from 250° C. to 350° C.

4. The method as claimed in claim 1, wherein the step of pyrolysing said second fraction is undertaken at a pyrolysis temperature of from 350° C. to 425° C.

5. The method as claimed in claim 1 wherein the step of pyrolysing said third fraction is undertaken at a pyrolysis temperature of from 425° C. to 525° C.

6. The method as claimed in claim 2, wherein the condensing is carried out at a temperature of 30° C. to 40° C.

7. The method as claimed in claim 1, wherein said biomass material comprises at least one of agricultural waste, wood waste, grasses, algae, water plants, organic refuse, municipal waste, sewage, sludge, animal waste, and combinations thereof.

8. The method as claimed in claim 7, wherein said biomass material is agricultural waste.

9. The method as claimed in claim 8, wherein said agricultural waste comprises at least one of palm waste, sugarcane bagasse, crop residues, sawdust, corn stover, soybean stover, grass, rice straw, wheat straw, straw, and combinations thereof.

10. The method as claimed in claim 9, wherein said palm waste comprises at least one of palm trunks, palm fronds, palm kernel shells, empty fruit bunches (EFB), palm oil mill effluent (POME) or fiber (a fibrous residue of palm oil milling operation) collected from palm oil mill waste, and combinations thereof.

11. The method as claimed in claim 1, wherein said biomass material has a particle size of less than about 2 mm.

12. The method as claimed in claim 1, wherein said biomass material has a moisture content of 10% to 20%.

13. The method as claimed in claim 1, wherein the biomass material comprises 10 wt % to 20 wt % lignin.

14. The method as claimed in claim 1, wherein the biomass material comprises 15 wt % to 25 wt % hemicellulose.

15. The method as claimed in claim 1, wherein the biomass material comprises 35 wt % to 60 wt % cellulose.

16. The method as claimed in claim 1, wherein the yield of biofuel is higher than about 65 wt %.

17. The method as claimed in claim 1, wherein the yield of tar is less than about 15 wt %.

* * * * *